(12) United States Patent
Zhang

(10) Patent No.: US 12,278,457 B2
(45) Date of Patent: Apr. 15, 2025

(54) OPTICAL FIBER MICROWAVE FREQUENCY TRANSMISSION METHOD BASED ON LASER FREQUENCY OFFSET-LOCKING

(71) Applicant: Xi'an Creation Keji CO., Ltd., Xi'an (CN)

(72) Inventor: Yi Zhang, Xi'an (CN)

(73) Assignee: Xi'an Creation Keji CO., Ltd., Xi'an (CN)

( * ) Notice: Subject to any disclaimer, the term of this patent is extended or adjusted under 35 U.S.C. 154(b) by 0 days.

(21) Appl. No.: 17/256,879

(22) PCT Filed: Dec. 21, 2020

(86) PCT No.: PCT/CN2020/138117
§ 371 (c)(1),
(2) Date: Dec. 29, 2020

(87) PCT Pub. No.: WO2022/133685
PCT Pub. Date: Jun. 30, 2022

(65) Prior Publication Data
US 2024/0266798 A1    Aug. 8, 2024

(51) Int. Cl.
*H01S 3/13* (2006.01)
*H01S 3/23* (2006.01)

(52) U.S. Cl.
CPC .......... *H01S 3/1305* (2013.01); *H01S 3/1307* (2013.01); *H01S 3/2391* (2013.01)

(58) Field of Classification Search
CPC .. H01S 3/13; H01S 3/1303–1398; H01S 3/23; H01S 3/2383; H01S 3/2391; H04B 10/2507–2575
See application file for complete search history.

(56) References Cited

U.S. PATENT DOCUMENTS

| 4,206,347 A * | 6/1980 | Avicola | H04J 14/08 398/91 |
| 5,687,261 A * | 11/1997 | Logan | H04B 10/50 385/11 |
| 2016/0211917 A1* | 7/2016 | Kowalevicz | H04B 10/00 |

FOREIGN PATENT DOCUMENTS

CN    103490816 A *  1/2014

* cited by examiner

*Primary Examiner* — Sean P Hagan
(74) *Attorney, Agent, or Firm* — Leong C. Lei

(57) ABSTRACT

An optical fiber microwave frequency transmission method based on laser frequency offset-locking includes: generating, by a master laser and a slave laser respectively, a master laser signal and a slave laser signal; transmitting, by an optical fiber link, the master laser signal and the slave laser signal to a microwave frequency receiver, and locking a frequency difference between the master laser and the slave laser to a preset microwave frequency; receiving a return laser signal returned from the microwave frequency receiver, the return laser signal including the master laser signal, the slave laser signal and a noise of the optical fiber link; generating a reference signal, and adjusting the preset microwave frequency to compensate the noise of the optical fiber link, so that a microwave frequency subsequently received by the microwave frequency receiver approaches a frequency of the reference signal.

7 Claims, 5 Drawing Sheets

OPTICAL FIBER MICROWAVE FREQUENCY TRANSMISSION METHOD BASED ON LASER FREQUENCY OFFSET-LOCKING

TECHNICAL FIELD

The disclosure relates the technical field of optical fiber frequency transmission, and in particular to an optical fiber microwave frequency transmission method based on laser frequency offset-locking.

BACKGROUND

Compared with a traditional coaxial cable and a satellite link, an optical fiber has advantages such as low transmission loss, strong anti-electromagnetic interference ability and high reliability. Therefore, through using an optical fiber link for frequency transmission, requirements of frequency signal transmission for following fields may be met, such as a time and frequency measurement, a basic physics research, a particle accelerator and a radio astronomical observation.

At present, a solution for optical fiber microwave frequency transmission is realized by modulating an intensity of a laser as a carrier by using a microwave signal to be transmitted. However, using the above solution, not only the intensity of the laser is modulated, at the same time, a frequency of the laser is modulated and thus a side-band is generated on the laser, thereby affecting accuracy and stability of microwave signal frequency transmission due to a laser polarization effect and a fiber dispersion effect.

SUMMARY

An embodiment of the disclosure aims to provide an optical fiber microwave frequency transmission method and an electronic device based on laser frequency offset-locking, so as to achieve purposes of reducing a influence of laser polarization effect and a fiber dispersion effect and improving an accuracy and a stability of microwave signal frequency transmission. The specific technical solution is as follows.

In a first aspect, The embodiment of the disclosure provides an optical fiber microwave frequency transmission method based on laser frequency offset-locking, adopted for a microwave frequency transmitter, and including: generating a master laser signal and a slave laser signal by a master laser and a slave laser respectively; transmitting the master laser signal and the slave laser signal to a microwave frequency receiver by an optical fiber link, and locking a frequency difference between the master laser and the slave laser to a preset microwave frequency by using a laser frequency offset-locking on the master laser signal and the slave laser signal; receiving a return laser signal returned from the microwave frequency receiver, where the return laser signal includes the master laser signal, the slave laser signal and a noise of the optical fiber link; and generating a reference signal, and adjusting the preset microwave frequency according to the reference signal and the return laser signal to compensate the noise of the optical fiber link to thereby make a microwave frequency subsequently received by the microwave frequency receiver approach a frequency of the reference signal.

Optionally, the master laser signal includes $E_M(t)=\cos(\omega_M t+\varphi_M)$, where $\omega_M$ represents a frequency of the master laser signal, $\varphi_M$ represents a phase of the master laser signal, $E_M(t)$ represents the master laser signal, and t represents a time; and where the slave laser signal includes $E_S(t)=\cos(\omega_S t+\varphi_S)$, where $\omega_S$ represents a frequency of the slave laser signal, $\varphi_S$ represents a phase of the slave laser signal, and $E_S(t)$ represents the slave laser signal.

Optionally, transmitting the master laser signal and the slave laser signal to a microwave frequency receiver by an optical fiber link, and locking a frequency difference between the master laser and the slave laser to a preset microwave frequency by using a laser frequency offset-locking on the master laser signal and the slave laser signal, includes: combining the master laser signal and the slave laser signal to obtain a combined laser signal by an optical fiber coupler, and outputting the combined laser signal split into equal proportions to a first output end and a second output end of the optical fiber coupler; transmitting the combined laser signal outputted from the first output end of the optical fiber coupler to the microwave frequency receiver by the optical fiber link; and performing the laser frequency offset-locking on the combined laser signal outputted from the second output end of the optical fiber coupler to lock a frequency difference between the master laser signal and the slave laser signals respectively generated from the master laser and the slave laser to the preset microwave frequency.

Optionally, performing the laser frequency offset-locking on the combined laser signal outputted from the second output end of the optical fiber coupler to lock a frequency difference between the master laser signal and the slave laser signals respectively generated from the master laser and the slave laser to the preset microwave frequency, includes: processing, by a first photodetector, the combined laser signal outputted from the second output end of the optical fiber coupler to output a first beat frequency signal $I(t)=\cos[(\omega_M-\omega_S)t+(\varphi_M-\varphi_S)]$ of the master laser signal and the slave laser signal; generating, by a voltage-controlled oscillator, a voltage-controlled oscillation signal $V_0=\cos(\omega_0 t+\varphi_0)$ with the preset microwave frequency, where $\omega_0$ represents the preset microwave frequency, and $\varphi_0$ represents a phase of the voltage-controlled oscillation signal; performing frequency-mixing on the first beat frequency signal and the voltage-controlled oscillation signal to obtain an error signal $V_{e0}=\cos[(\omega_M-\omega_S-\omega_0)t+(\varphi_M-\varphi_S-\varphi_0)]$ of the frequency difference between the master laser signal and the slave laser signal compared with the preset microwave frequency; and receiving, by a first servo controller, the error signal, and adjusting the frequency of the master laser signal or the frequency of the slave laser signal to lock the frequency difference between the master laser signal generated from the master laser and the slave laser signal generated from the slave laser to the preset microwave frequency.

Optionally, adjusting the frequency of the master laser signal or the frequency of the slave laser signal to lock the frequency difference between the master laser signal generated from the master laser and the slave laser signal generated from the slave laser to the preset microwave frequency, includes: adjusting the frequency $\omega_M$ of the master laser signal or the frequency $\omega_S$ of the slave laser signal to make $\omega_M-\omega_S-\omega_0=0$ be satisfied, so that the error signal after the adjusting is a constant $\cos[\xi_0]$, where $\xi_0=\varphi_M-\varphi_S-\varphi_0$.

Optionally, the reference signal includes $V_r=\cos(\omega_r t+\varphi_r)$, $\omega_r$ represents the frequency of the reference signal, $\varphi_r$ represents a phase of the reference signal, and $V_r$ represents the reference signal.

Optionally, adjusting the preset microwave frequency according to the reference signal and the return laser signal to compensate the noise of the optical fiber link to thereby make a microwave frequency subsequently received by the microwave frequency receiver approach a frequency of the reference signal, includes: generating a first conjugated signal $V_1=\cos(\omega_1 t+\varphi_1)$ and a second conjugated signal $V_2=\cos(\omega_2 t+\varphi_2)$ according to the reference signal, where $\omega_1$ and $\omega_2$ represent a frequency of the first conjugated signal and a frequency of the second conjugated signal respectively, and $\varphi_1$ and $\varphi_2$ represent a phase of the first conjugated signal and a phase of the second conjugated signal respectively, and $\omega_1+\omega_2=2\omega_r$ and $\varphi_1+\varphi_2=2\varphi_r+\xi$, where $\xi$ is a constant; performing, by a second photodetector, a conversion of laser signal to radio frequency signal on the return laser signal to thereby output a converted return laser signal $V_{back}=\cos(\omega_0 t+\varphi_0+\xi_0+2\varphi_p)$; where $\varphi_p$ is the noise of the optical fiber link; performing frequency-mixing on the voltage-controlled oscillation signal outputted by the voltage-controlled oscillator and the first conjugated signal to obtain a first mixed signal $V_{e1}=\cos[(\omega_0-\omega_1)t+\varphi_0-\varphi_1]$ and outputting the first mixed signal; performing frequency-mixing on the second conjugated signal and the converted return laser signal to obtain a second mixed signal, $V_{e2}=\cos[(\omega_2-\omega_0)t+\varphi_2-\varphi_0-\xi_0-2\varphi_p]$, and outputting the second mixed signal; performing frequency-mixing on the first mixed signal and the second mixed signal to obtain a third mixed signal $V_{e3}=\cos[(\omega_1+\omega_2-2\omega_0)t+\varphi_1+\varphi_2-2\varphi_0-2\varphi_p-\xi_0]$, and outputting the third mixed signal; and performing, by a second servo controller, a feedback control on the voltage-controlled oscillator according to the third mixed signal to thereby make the preset microwave frequency be equal to the frequency of the reference signal.

Optionally, performing, by a second servo controller, a feedback control on the voltage-controlled oscillator according to the third mixed signal to thereby make the preset microwave frequency be equal to the frequency of the reference signal, includes: adjusting, by the second servo controller, an input voltage of the voltage-controlled oscillator to thereby make a frequency of the voltage-controlled oscillation signal outputted by the voltage-controlled oscillator satisfy that $\omega_1+\omega_2-2\omega_0=0$, so that the third mixed signal after the adjusting is a constant $\cos[\xi_1]$, where $\xi_1=\varphi_1+\varphi_2-2\varphi_0-2\varphi_p-\xi_0$.

Optionally, the frequency of the reference signal is a microwave band frequency below 10 GHz.

In a second aspect, an embodiment of the disclosure provides an electronic device including a processor and a memory, where the memory is configured to store a computer program; and the processor is configured to execute the optical fiber microwave frequency transmission method based on laser frequency offset-locking provided by the embodiment of the disclosure when executing the computer program stored in the memory.

In the solutions provided according to the embodiments of the disclosure, the microwave frequency transmitter uses a laser frequency offset-locking to lock a frequency difference between two lasers to a frequency of a reference signal, compared with the previous solution of modulating the intensity of the laser as the carrier with the microwave signal to be transmitted, for the solutions of the disclosure, an influence of a laser polarization effect and a fiber dispersion effect caused by a laser intensity modulation can be overcome, and an accuracy and stability of microwave signal frequency transmission can be improved. Also, through performing compensation on the noise of an optical fiber link in the solutions of the disclosure, the accuracy and stability of microwave signal frequency transmission in the transmission process of the optical fiber link can be further ensured.

DETAILED DESCRIPTION OF EMBODIMENTS

In order to further illustrate technical means and effects adopted by the disclosure to achieve the intended purpose of the disclosure, the display driving method, the display driving device and the display apparatus proposed in accordance with the disclosure will be described in detail hereinafter with reference to the accompanying drawings and specific embodiments. The technical solutions in embodiments of the disclosure will be described clearly and completely with reference to the drawings in the embodiments of the disclosure. It is clearly that the described embodiments are only part of the embodiments of the disclosure, not all of them. Based on the embodiments of the disclosure, all other embodiments obtained by those of ordinary skill in the art without a creative labor fall in the scope of protection of the disclosure.

In order to reduce an influence of a laser polarization effect and a fiber dispersion effect and improve an accuracy and a stability of microwave signal frequency transmission, an embodiment of the disclosure provides an optical fiber microwave frequency transmission method and an electronic device based on laser frequency offset-locking, which are adapted for a microwave frequency transmitter (also referred to as transmitter of microwave frequency).

It should be noted that an executive body of the optical fiber microwave frequency transmission method based on the laser frequency offset-locking provided by the embodiment of the disclosure can be an optical fiber microwave frequency transmission device based on laser frequency offset-locking, which may be operated in the electronic device. The electronic device may be a microwave frequency transmitting device, of course, it is not limited thereto.

In a first aspect, the optical fiber microwave frequency transmission method based on laser frequency offset-locking provided by the embodiment of the disclosure is hereinafter introduced.

Figure 1:
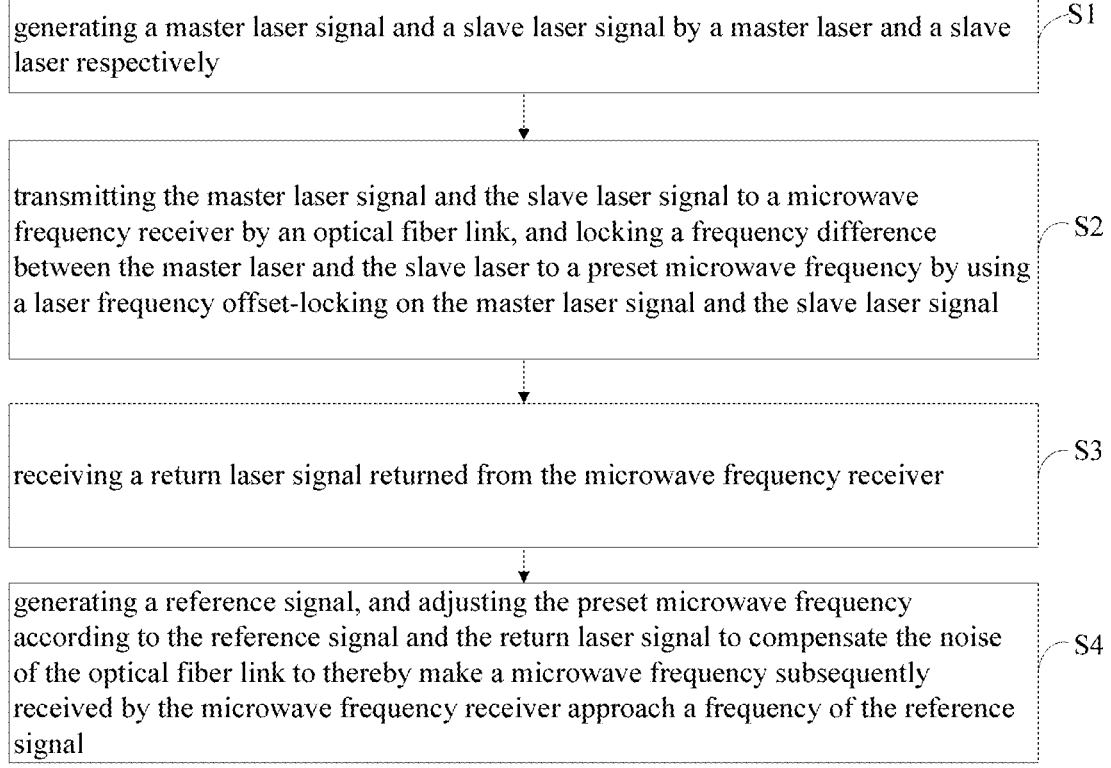
FIG. 1 is a schematic flow diagram of an optical fiber microwave frequency transmission method based on laser frequency offset-locking provided by an embodiment of the disclosure.

As shown in FIG. 1, the optical fiber microwave frequency transmission method based on laser frequency offset-locking provided by the embodiment of the disclosure may include steps S1 to S4.

In step S1, a master laser signal and a slave laser signal are generated by a master laser and a slave laser respectively.

In an embodiment of the disclosure, the master laser is configured to generate the master laser signal and the slave laser is configured to generate the slave laser signal. Further, the two lasers can be any type of laser in related art, and are not limited herein.

In a preferred embodiment, the master laser signal and the slave laser signal are generated simultaneously.

In step S2, the master laser signal and the slave laser signal are transmitted to a microwave frequency receiver (also referred to as receiver of microwave frequency) by an optical fiber link, a frequency difference between the master laser and the slave laser is locked to a preset microwave frequency by using a laser frequency offset-locking on the master laser signal and the slave laser signal.

In the embodiment of the disclosure, on one hand, the master laser signal and the slave laser signal are transmitted to the microwave frequency receiver by the optical fiber link, such that a microwave frequency reception of the receiver is realized. On the other hand, the frequency difference between the master laser and the slave laser is locked to the preset microwave frequency using the laser frequency offset-locking, so as to form an equivalent relationship between the frequency difference between the master laser and the slave laser and the preset microwave frequency, thereby using the frequency difference between the master laser and the slave laser to characterize the preset microwave frequency.

The laser frequency offset-locking adopted in the embodiment of the disclosure is one of active frequency stabilization technologies, which is configured to lock a frequency difference between two lasers to a preset frequency, and in case of a relative change of frequencies of two lasers due to external influence, identify a relative change between the frequencies of the two lasers, and adjust a frequency of one of the two lasers through a feedback control, so as to make the frequencies of the two lasers to be stable relatively, that is, make the frequency difference to be fixed. According to the embodiment of the disclosure, through using the laser frequency offset-locking, the frequency difference between the two lasers can be locked to the preset microwave frequency which is the same as a frequency of the reference signal of the microwave frequency transmitter, that is, the frequency of the reference signal to be transmitted is modulated on the frequency difference between the two lasers, such that fiber microwave frequency transmission can be realized without using a carrier laser intensity modulation solution.

A specific description of the laser frequency offset-locking will not be described in detail herein, and explanations of a related prior art could be referred for obtaining the specific description.

In step S3, a return laser signal returned from the microwave frequency receiver is received.

When a signal is transmitted in an optical fiber, the transmitted signal is disturbed by an external environment factors such as a temperature and a vibration and thus a phase noise may be introduced into the transmitted signal and a frequency stability of the transmitted signal is influenced. In order to detect a noise of the optical fiber link and perform a corresponding compensation on the noise, the receiver is configured to, upon receiving the master laser signal and the slave laser signal transmitted from the microwave frequency transmitter, return part of the received laser signals to the microwave frequency transmitter along an original path of the received path, so as to make the microwave frequency transmitter perform a corresponding compensation according to the returned part of the received laser signals to realize subsequent high-precision signal transmission.

In an embodiment of the disclosure, the return laser signal as received includes the master laser signal, the slave laser signal and the noise of the optical fiber link.

It can be understood that, the noise of the optical fiber link included in the return laser signal is the noise generated during a round trip in the optical fiber link.

In step S4, a reference signal is generated, and the preset microwave frequency is adjusted according to the reference signal and the return laser signal to compensate the noise of the optical fiber link to thereby make a microwave frequency subsequently received by the receiver approach the frequency of the reference signal.

The reference signal may be generated by a reference signal generator of the microwave frequency transmitter. The reference signal generator may be a signal source and so on. The frequency of the reference signal approaches a microwave frequency to be transmitted of the microwave frequency transmitter.

In an embodiment of the disclosure, the transmitter may perform a certain difference comparison processing according to the reference signal and the return laser signal, and compensate the noise of the optical fiber link by adjusting the preset microwave frequency so as to make the preset microwave frequency approach the frequency of the reference signal. When the adjustment is completed, a structure and component parameters of the microwave frequency transmitter are fixed, therefore, in a subsequent microwave frequency transmission process, the microwave frequency transmitter is not required to be adjusted again, and the microwave frequency subsequently received by the receiver approaches the frequency of the reference signal, that is, the microwave frequency is transmitted stably and lossless. The specific adjustment process will be described in detail hereinafter.

In the embodiment of the disclosure, any noise compensation method for optical fiber microwave frequency transmission in the prior art can be adopted to realize the purpose of compensating the noise of the optical fiber link and the noise compensation method of the embodiment of the disclosure is not limited herein.

In the solutions provided according to the embodiments of the disclosure, the microwave frequency transmitter uses a laser frequency offset-locking to lock a frequency difference between two lasers to a frequency of a reference signal, compared with the previous solution of modulating the intensity of the laser as the carrier with the microwave signal to be transmitted, for the solutions of the disclosure, an influence of a laser polarization effect and a fiber dispersion effect caused by a laser intensity modulation can be overcome, and an accuracy and stability of microwave signal frequency transmission can be improved. Also, through performing compensation on a noise of an optical fiber link in the solutions of the disclosure, the accuracy and stability of microwave signal frequency transmission in the transmission process of the optical fiber link can be further ensured.

In order to facilitate understanding of the optical fiber microwave frequency transmission method based on laser frequency offset-locking of the disclosure, following description will be made in connection with the structures of the transmitter and the receiver of the embodiment of the disclosure.

Figure 2:
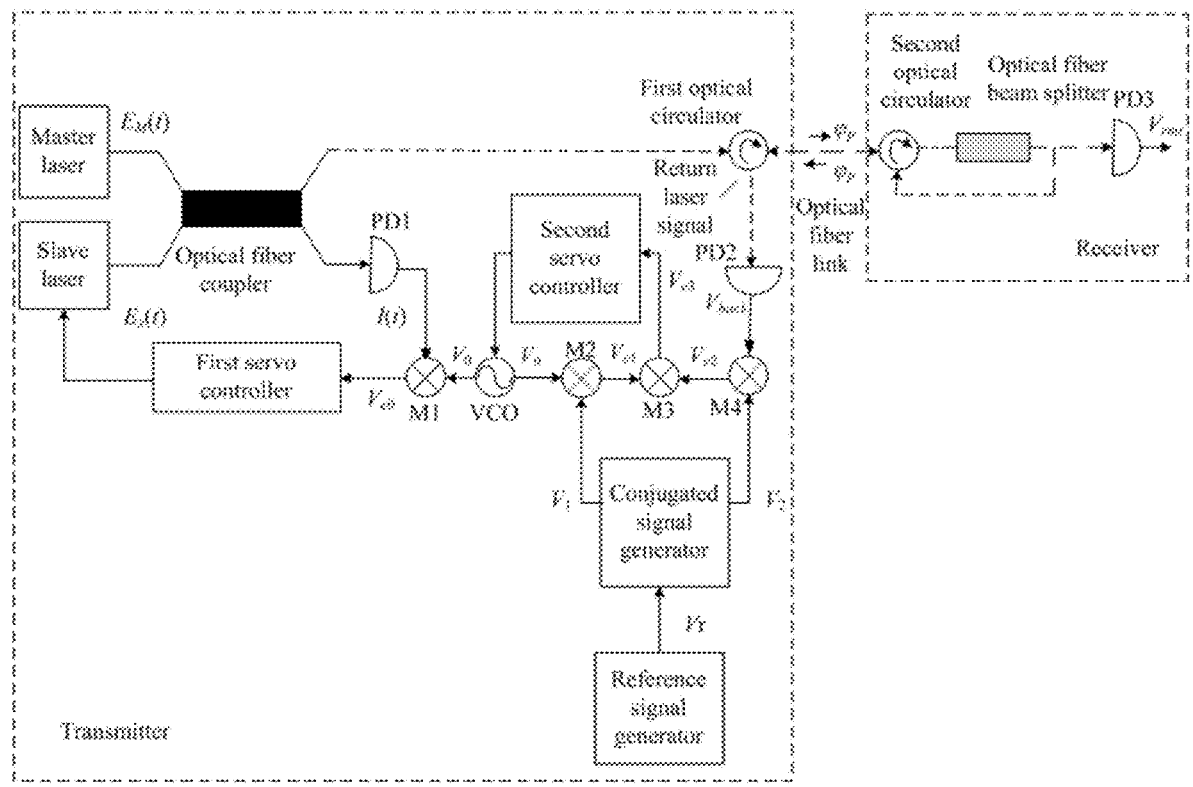
FIG. 2 is a specific schematic structural diagram of a microwave frequency transmitter and a microwave frequency receiver for applying an optical fiber microwave frequency transmission method based the laser frequency offset-locking provided by an embodiment of the disclosure.

As an optional embodiment, reference is made to FIG. 2, which is a specific schematic structural diagram of a transmitter and a receiver of microwave frequency of an optical fiber microwave frequency transmission method based on laser frequency offset-locking provided by an embodiment of the disclosure. The transmitter and the receiver are represented by a dotted line box, a dotted line and a solid line represent signal lines, which represent an optical signal and a radio frequency signal respectively. Further, a mark of each signal is specifically illustrated in the drawings.

1) The transmitter includes: a master laser, a slave laser, a fiber coupler, a first photodetector PD1, a voltage-controlled oscillator VCO, a first mixer M1, a first servo controller, a first optical circulator, a second photodetector PD2, a reference signal generation module, a conjugated signal generation module, a second mixer M2, a third mixer M3, a fourth mixer M4 and a second servo controller.

Specifically, an output end of the master laser and an output end of the slave laser are respectively connected to two input ends of the optical fiber coupler. Two output ends of the optical fiber coupler are respectively connected to the optical fiber link and an input end of the first photodetector PD1. A first input end of the first mixer M1 is connected to an output end of the first photodetector PD1. A second input end of the first mixer M1 is connected to a first output end of the voltage-controlled oscillator VCO. An input end of the first servo controller is connected to an output end of the first mixer M1. An output end of the first servo controller is connected to the master laser or the slave laser.

The first optical circulator is connected in series between the first output end of the optical fiber coupler and the optical fiber link through a first end and a second end of the first optical circulator, and a third end of the first optical circulator is connected to an input end of the second photodetector PD2. A input end of the conjugated signal generator is connected to an output end of the reference signal generator. A first output end and a second output end of the conjugated signal generator are respectively connected to a first input end of the second mixer M2 and a first input end of the fourth mixer M4. A second input end of the second mixer M2 is connected to a second output end of a voltage-controlled oscillator VCO. A second input end of the fourth mixer M4 is connected to an output end of the second photodetector PD2. The third mixer M3 is connected in series between output ends of the second mixer M2 and the fourth mixer M4. An output end of the third mixer M3 is connected to an input end of the second servo controller. An output end of the second servo controller is connected to an input end of the voltage-controlled oscillator VCO.

For step S1, the master laser signal generated by the master laser includes $E_M(t)=\cos(\omega_M t+\varphi_M)$, where $\omega_M$ represents a frequency of the master laser signal, $\varphi_M$ represents a phase of the master laser signal, $E_M(t)$ represents the master laser signal, and t represents a time. The slave laser signal generated by the slave laser includes $E_S(t)=\cos(\omega_S t+\varphi_S)$, where $\omega_S$ represents a frequency of the slave laser signal, $\varphi_S$ represents a phase of the slave laser signal, and $E_S(t)$ represents the slave laser signal.

Figure 4:
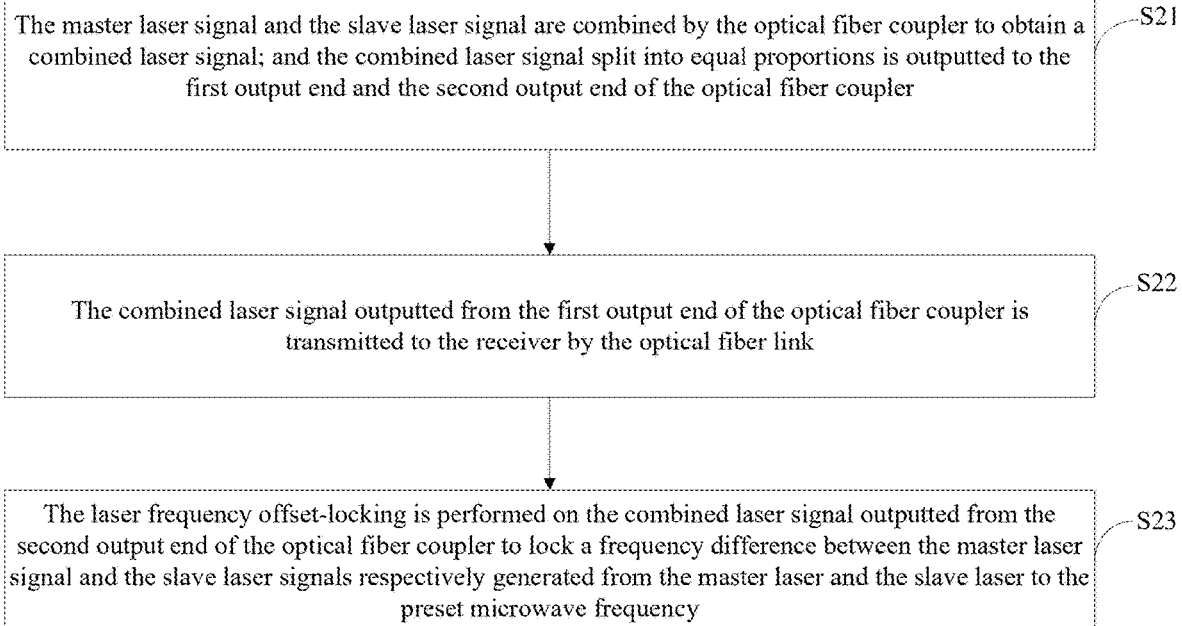
FIG. 4 is a detailed process of the step S2 of FIG. 1 according to an embodiment of the disclosure.

For step S2, in an optional embodiment, step S2 may include steps S21 to S23, as illustrated in FIG. 4.

In step S21, the master laser signal and the slave laser signal are combined by the optical fiber coupler to obtain a combined laser signal; the combined laser signal split into equal proportions is outputted to the first output end and the second output end of the optical fiber coupler.

The optical fiber coupler, which is also known as a splitter, a connector, an adapter and an optical fiber flange, is an element for realizing optical signal splitting/combining or extending an optical fiber link, which can realize distribution or combination of optical signal power among different optical fibers.

In the embodiment of the disclosure, the optical fiber coupler combines the master laser signal and the slave laser signal to form a combined laser signal and then splits the combined laser signal in the equal proportions, and each combined laser signal outputted by the first output end and the second output end contains the master laser signal and the slave laser signal.

In step S22, the combined laser signal outputted from the first output end of the optical fiber coupler is transmitted to the receiver by the optical fiber link.

Step S22 aims to realize transmission of a microwave frequency, and the transmitted microwave frequency can be obtained by the receiver through processing the received combined laser signals.

In step S23, the laser frequency offset-locking is performed on the combined laser signal outputted from the second output end of the optical fiber coupler to lock a frequency difference between the master laser signal and the slave laser signals respectively generated from the master laser and the slave laser to the preset microwave frequency.

Figure 5:
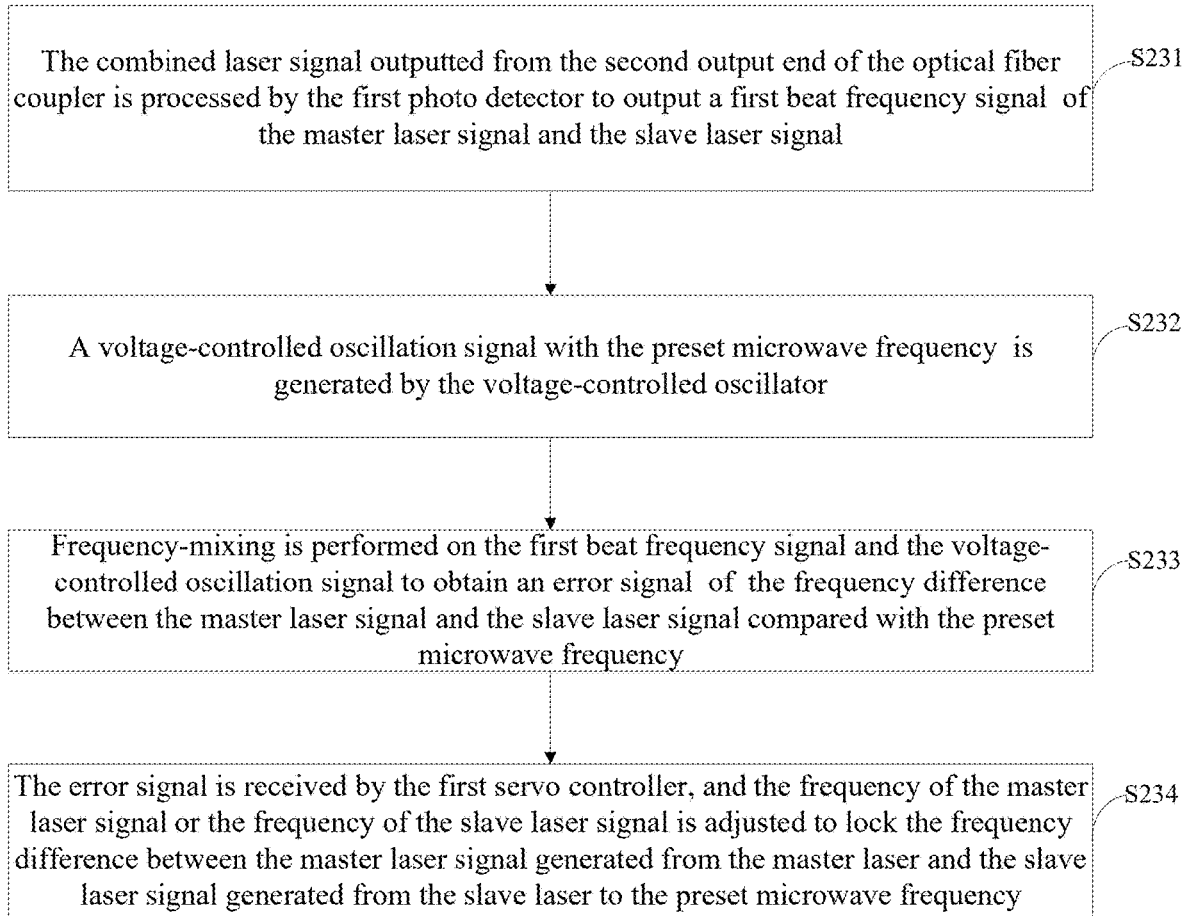
FIG. 5 is a detailed process of the step S23 of FIG. 4 according to an embodiment of the disclosure.

In an optional embodiment, step S23 may include steps S231 to S234, as illustrated in FIG. 5.

In step S231, the combined laser signal outputted from the second output end of the optical fiber coupler is processed by the first photodetector to output a first beat frequency signal $I(t)=\cos[(\omega_M-\omega_S)t+(\varphi_M-\varphi_S)]$ of the master laser signal and the slave laser signal.

In an embodiment of the disclosure, the combined laser signal from the second output end of the optical fiber coupler is inputted to the first photodetector PD1.

The photodetector is able to convert an optical signal into an electrical signal. In the embodiment of the disclosure, the photodetector is specifically configured to convert a laser signal into radio a radio frequency signal.

A beat frequency is a special form of periodic variation of a difference frequency and a specific meaning of the beat frequency signal can be understood with reference to the prior art, and is not repeated herein.

In step S232, a voltage-controlled oscillation signal with the preset microwave frequency $V_0=\cos(\omega_0 t+\varphi_0)$ is generated by the voltage-controlled oscillator.

The voltage-controlled oscillator is an oscillation circuit whose output frequency has a corresponding relationship with an input control voltage. In the embodiment of the disclosure, any existing voltage-controlled oscillator, such as an LC voltage-controlled oscillator, an RC voltage-controlled oscillator and a crystal voltage-controlled oscillator, can be configured to generate the voltage-controlled oscillation signal.

Where $\omega_0$ represents the preset microwave frequency and $\varphi_0$ represents a phase of the voltage-controlled oscillation signal.

In step S233, frequency-mixing is performed on the first beat frequency signal and the voltage-controlled oscillation signal to obtain an error signal $V_{e0}=\cos[(\omega_M-\omega_S-\omega_0)t+(\varphi_M-\varphi_S-\varphi_0)]$ of the frequency difference between the master laser signal and the slave laser signal compared with the preset microwave frequency.

Referring to FIG. 2, in an embodiment of the disclosure, the frequency-mixing is performed on the first beat frequency signal and the voltage-controlled oscillation signal by the first mixer M1 to obtain the error signal.

A principle and specific structure of the mixer can be obtained with reference to the related prior art, and will be not repeated herein.

In step S234, the error signal is received by the first servo controller, and the frequency of the master laser signal or the frequency of the slave laser signal is adjusted to lock the frequency difference between the master laser signal generated from the master laser and the slave laser signal generated from the slave laser to the preset microwave frequency.

The servo controller has a self-adaptive adjustment control function. In the embodiment of the disclosure, any servo control circuit is able to be configured to form the servo controller, which can achieve adjustment of a frequency of a laser signal generated from any laser.

The first servo controller locks the frequency difference of the laser signals generated from the two lasers to the preset microwave frequency, that is, locks the frequency difference to a frequency of the voltage-controlled oscillation signal. It can be understood that, the first servo controller adjusts the frequency of the laser signal generated from the laser connected thereto.

Specifically, in step S234, the frequency of the master $\omega_M$ laser signal or the frequency of the slave laser signal $\omega_S$ is adjusted to make $\omega_M - \omega_S - \omega_0 = 0$ be satisfied, so that the error signal after the adjusting is a constant $\cos[\xi_0]$, where $\xi_0 = \varphi_M - \varphi_S - \varphi_0$.

As shown in FIG. 2, the first servo controller is connected to the slave laser, and thus the frequency of the slave laser signal $\omega_S$ is correspondingly adjusted.

That is to say, a preferred embodiment is shown in FIG. 2, the frequency of the slave laser signal $\omega_S$ is adjusted to make $\omega_M - \omega_S - \omega_0 = 0$ be satisfied, and to make the error signal be $V_{e0} = \cos[(\varphi_M - \varphi_S - \varphi_0)]$. Further, since each of $\varphi_M$, $\varphi_S$, and $\varphi_0$ is a constant, $\varphi_M - \varphi_S - \varphi_0$ is recorded as a constant $\xi_0$, and the error signal is determined as $V_{e0} = \cos[\xi_0]$ which is a constant. The error signal $V_{e0}$ does not change with time, and the frequency difference between the master and slave lasers can be locked to the frequency $\omega_0$ of the voltage-controlled oscillation signal outputted by the voltage-controlled oscillator VCO. It can be seen that, the frequency $\omega_0$ of the voltage-controlled oscillation signal can be obtained by obtaining the frequency difference between the master laser signal and the slave laser signal, when the frequency $\omega_0$ of the voltage-controlled oscillation signal is changed and the master laser signal and the slave laser signal are outputted. Therefore, the frequency difference between the master laser signal and the slave laser signal and the frequency of the voltage-controlled oscillator VCO can be configured to realize the transmission of the preset microwave frequency, and the fiber microwave frequency transmission can be realized without using the carrier laser intensity modulation solution.

In an embodiment of the disclosure, steps S22 and S23 may be performed simultaneously.

For step S3, referring to FIG. 2, in an embodiment of the disclosure, the return laser signal returned from the receiver is received through the first optical circulator. Herein the return laser signal exemplarily includes the master laser signal, the slave laser signal and the noise of the optical fiber link. It can be understood that, if the noise of one way of the optical fiber link is $\varphi_p$, the noise of the optical fiber link included in the return laser signal is $2\varphi_p$.

Figure 6:
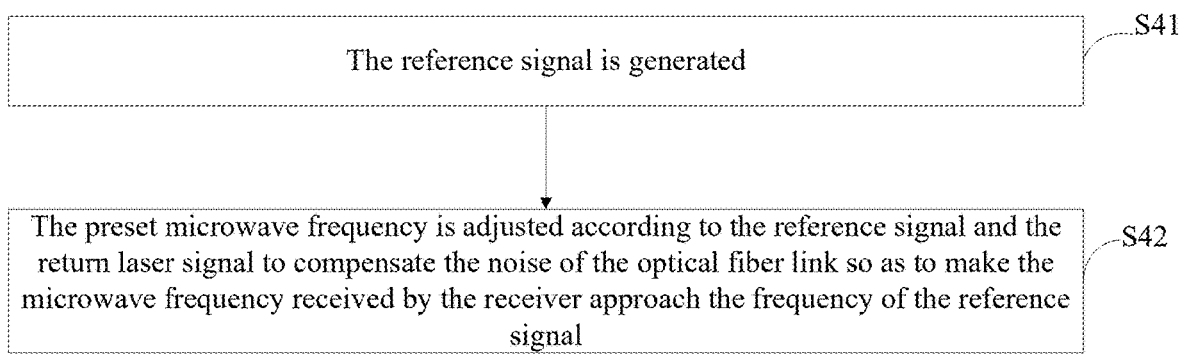
FIG. 6 is a detailed process of the step S4 of FIG. 1 according to an embodiment of the disclosure.

For step S4, step S4 may include steps S41 and S42, as illustrated in FIG. 6.

In step S41, the reference signal is generated.

The reference signal includes $V_r = \cos(\omega_r t + \varphi_r)$, where $\omega_r$ represents a frequency of a reference signal, and $\varphi_r$ represents a phase of the reference signal, and $V_r$ represents the reference signal. The frequency $\omega_r$ of the reference signal approaches a microwave frequency to be transmitted.

In step S42, the preset microwave frequency is adjusted according to the reference signal and the return laser signal to compensate the noise of the optical fiber link so as to make the microwave frequency received by the receiver approach the frequency of the reference signal.

Figure 7:
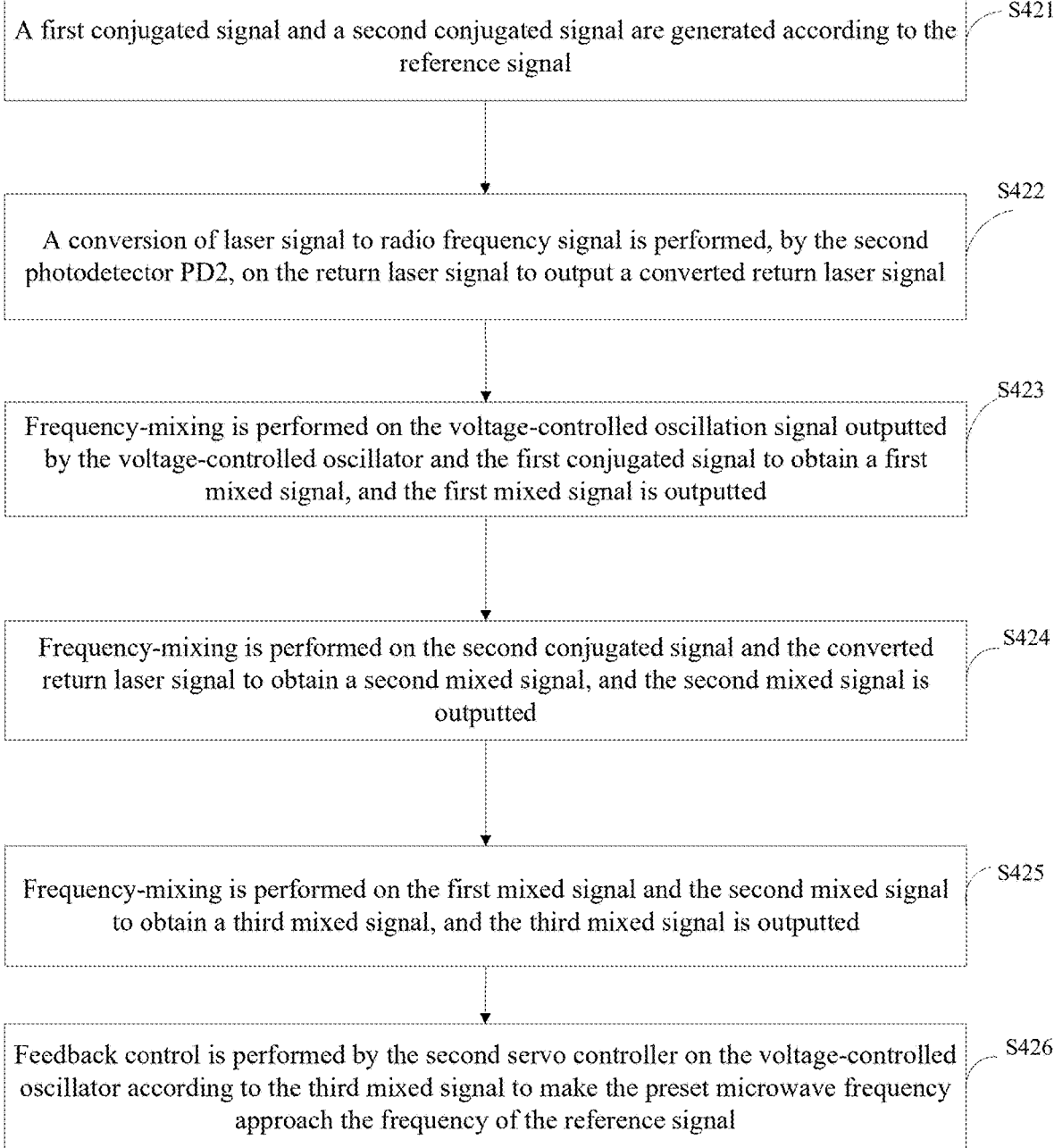
FIG. 7 is a detailed process of the step S42 of FIG. 6 according to an embodiment of the disclosure.

In an optional embodiment, step S42 may include steps S421 to S426, as illustrated in FIG. 7.

In step S421, a first conjugated signal $V_1 = \cos(\omega_1 t + \varphi_1)$ and a second conjugated signal $V_2 = \cos(\omega_2 t + \varphi_2)$ are generated according to the reference signal.

Where $\omega_1$ and $\omega_2$ represent a frequency of the first conjugated signal and a frequency of the second conjugated signal respectively, and $\varphi_1$ and $\varphi_2$ represent a phase of the first conjugated signal and a phase of the second conjugated signal respectively, and $\omega_1 + \omega_2 = 2\omega_r$ and $\varphi_1 + \varphi_2 = 2\varphi_r + \xi$, $\xi$ is a constant.

Referring to FIG. 2, step S421 can be implemented by a conjugated signal generation module. A specific description of the conjugated signal and the specific implementation mode of the conjugated signal generation module can be obtained with reference to the related prior art, and will be not repeated herein.

In step S422, a conversion of laser signal to radio frequency signal is performed, by the second photodetector PD2, on the return laser signal to output a converted return laser signal $V_{back} = \cos(\omega_0 t + \varphi_0 + \xi_0 + 2\varphi_p)$.

Herein $\varphi_p$ is the noise of the optical fiber link. The noise of optical fiber link here refers to the noise of one-way of the optical fiber link.

In step S423, frequency-mixing is performed on the voltage-controlled oscillation signal outputted by the voltage-controlled oscillator and the first conjugated signal to obtain a first mixed signal $V_{e1} = \cos[(\omega_0 - \omega_1)t + \varphi_0 - \varphi_1]$, that is to say, to obtain a difference frequency term between the voltage-controlled oscillation signal and the first conjugated signal as the first mixed signal $V_{e1} = \cos[(\omega_0 - \omega_1)t + \varphi_0 - \varphi_1]$, and the first mixed signal is outputted.

Referring to FIG. 2, in this step, the second mixer M2 is configured to output the first mixed signal.

In step S424, frequency-mixing is performed on the second conjugated signal and the converted return laser signal to obtain a second mixed signal, $V_{e2} = \cos[(\omega_2 - \omega_0)t + \varphi_2 - \varphi_0 - \xi_0 - 2\varphi_p]$, that is to say, to obtain a difference frequency term between the second conjugated signal and the converted return laser signal as the second mixed signal $V_{e2} = \cos[(\omega_2 - \omega_0)t + \varphi_2 - \varphi_0 - \xi_0 - 2\varphi_p]$, and the second mixed signal is outputted.

Referring to FIG. 2, in step S424, the fourth mixer M4 is configured to output the second mixed signal. In step S425, frequency-mixing is performed on the first mixed signal and the second mixed signal to obtain a third mixed signal $V_{e3} = \cos[(\omega_1 + \omega_2 - 2\omega_0)t + \varphi_1 + \varphi_2 - 2\varphi_0 - 2\varphi_p - \xi_0]$, that is to say, to obtain a difference frequency term between the first mixed signal and the second mixed signal as the third mixed signal $V_{e3} = \cos[(\omega_1 + \omega_2 - 2\omega_0)t + \varphi_1 + \varphi_2 - 2\varphi_0 - 2\varphi_p - \xi_0]$, and the third mixed signal is outputted.

Referring to FIG. 2, in this step, the third mixer M3 is configured to output the third mixed signal.

In step S426, a feedback control is performed by the second servo controller on the voltage-controlled oscillator according to the third mixed signal to make the preset microwave frequency approach the frequency of the reference signal.

In an optional embodiment, in step S426, an input voltage of the voltage-controlled oscillator is adjusted by the second servo controller to make a frequency of the voltage-controlled oscillation signal outputted by the voltage-controlled oscillator satisfy $\omega_1+\omega_2-2\omega_0=0$, such that an adjusted third mixed signal is a constant cos $[\xi_1]$, where $\xi_1=\varphi_1+\varphi_2-2\varphi_0-2\varphi_p-\xi_0$.

Specifically, the input voltage of the voltage-controlled oscillator is adjusted to make the frequency of the voltage-controlled oscillation signal outputted by the voltage-controlled oscillator satisfy that $\omega_1+\omega_2-2\omega_0=0$, such that the adjusted third mixed signal is $V_{e3}=\cos[\varphi_1+\varphi_2-2\varphi_0-2\varphi_p-\xi_0]$. Since $\varphi_1$, $\varphi_2$, $\varphi_0$, $\varphi_p$ and $\xi_0$ are constants, assuming $\varphi_1+\varphi_2-2\varphi_0-2\varphi_p-\xi_0=\xi_1$ the adjusted third mixed signal is also the constant cos $[\xi_1]$, which does not change with time.

In an optional embodiment, the frequency of the reference signal is a microwave band frequency below 10 GHz. Specifically, the frequency of the reference signal may be 300 MHz to 10 GHz.

In order to understand the details of the microwave frequency received by the receiver, it is necessary to explain a structure of the receiver accordingly, which will be illustrated in the following alternative embodiments.

2) The receiver includes: a second optical circulator, an optical fiber beam splitter and a third photodetector PD3.

The second optical circulator and the optical fiber beam splitter are configured to return part of the laser signal transmitted to the receiver to the transmitter.

The third photodetector is configured to detect and obtain a second beat frequency signal $V_{rmt}=\cos(\omega_0 t+\varphi_0+\varphi_p+\xi_0)$ of the master laser signal and the slave laser signal, where the second beat frequency signal contains the noise of the optical fiber link. The second beat frequency signal is a beat frequency signal of the master laser signal and the slave laser signal originally received by the receiver, and is added with the noise of the optical fiber link.

The following focuses on the reason why the microwave frequency subsequently received by the receiver can be the frequency of the reference signal through implementing the method of the embodiment of the disclosure.

Through the adjustment of the transmitter, the frequency of the voltage-controlled oscillation signal outputted by the voltage-controlled oscillator satisfies that $\omega_1+\omega_2-2\omega_0=0$, $\varphi_1+\varphi_2-2\varphi_0-2\varphi_p-\xi_0=\xi_1$. According to the relationship between the first conjugated signal and the second conjugated signal, following equations are obtained, $\omega_1+\omega_2=2\omega_r$, $\varphi_1+\varphi_2=2\varphi_r+\xi$. Therefore, following equations are obtained:

$$\omega_0 = \omega_r, \varphi_0 + \varphi_p = \frac{2\varphi_r + \xi - \xi_0 - \xi_1}{2}.$$

For $$\omega_0 = \omega_r, \varphi_q + \varphi_p = \frac{2\varphi + \xi - \xi_0 - \xi_1}{2}, \text{ and}$$

$$V_{rmt} = \cos\left(\omega_r t + \frac{2\varphi_r + \xi + \xi_0 - \xi_1}{2} + \xi_0\right),$$

since $\xi$, $\xi_0$ and $\xi_1$ are all constants and do not affect the stability performance of the frequency signals, and can be ignored. After the constant items $\xi$, $\xi_0$ and $\xi_1$ are ignored, the second beat frequency signal $V_{rmt}$ is equivalent to cos($\omega_r t+\varphi_r$) that is, a frequency of the second beat frequency signal received by the microwave frequency receiver is a frequency of the reference signal of the microwave frequency receiver. This shows that the signal received by the microwave frequency receiver is locked to the reference signal of the transmitter, and compensation on the noise of the optical fiber link is realized.

Two laser beams are transmitted in a same optical fiber, and the influences of external interference on them are almost equal. A microwave signal is obtained through Beat frequency detection, and an interference of a common mode noise may be reduced.

It should be noted that, if the microwave frequency receiver can obtain the frequency of the reference signal, the microwave frequency receiver does not need to transmit the return laser signal, and the transmitter does not need to perform compensation on the noise of the optical fiber link.

The solution provided by the embodiment of the disclosure is a new solution which is different from the current optical fiber microwave transmission using a laser intensity modulation. On the basis of a doppler noise elimination method, this solution uses a principle that a noise introduced by an optical fiber is a common mode component when two lasers are transmitted in the same optical fiber, and uses laser frequency offset-locking to modulate the frequency of the reference signal to be transmitted at the transmitter to the frequency difference between the two lasers, and then the modulated reference signal propagates in the same optical fiber link after being combined by an optical fiber coupler. That is to say, the two lasers with the constant frequency difference are used to realize the fiber microwave frequency transmission. Therefore, when the two lasers propagate in the optical fiber link, the noise caused by a laser polarization effect, a temperature, a vibration has a symmetrical influence on the two laser beams, which can be reduced by a beat frequency detection process. Compared with the previous solution of modulating the intensity of the laser as the carrier with the microwave signal to be transmitted, for the solutions of the disclosure, an influence of a laser polarization effect and a fiber dispersion effect caused by a laser intensity modulation can be overcome, the sensitivity of noise sources such as a temperature, a vibration and a stress is reduced, and the anti-interference ability of the system is enhanced and an accuracy and stability of microwave signal frequency transmission can be improved. Also, through performing an active compensation on a noise of an optical fiber link in the solutions of the disclosure, the accuracy and stability of microwave signal frequency transmission in the transmission process of the optical fiber link can be further ensured.

Figure 3:
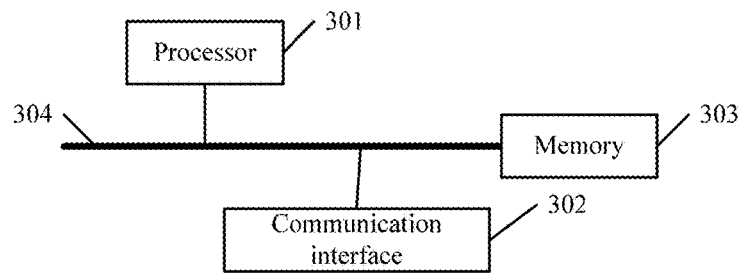
FIG. 3 is a schematic structural diagram of an electronic device provided by an embodiment of the disclosure.

In a second aspect, an embodiment of the disclosure also provides an electronic device, as shown in FIG. 3, which includes a processor 301, a communication interface 302, a memory 303 and a communication bus 304, where the processor 301, the communication interface 302 and the memory 303 communicate with each other through the communication bus 304. The memory 303 is configured to store a computer program. The processor 301 is configured to implement the optical fiber microwave frequency transmission method based on laser frequency offset-locking according to the first aspect when executing the computer program stored in the memory 303.

The electronic device may be a desktop computer, a portable computer, an intelligent mobile terminal, a server and the like. Any electronic device that can be used to realize the disclosure belongs to the protection scope of the disclosure and is not limited herein.

The communication bus in the above electronic device can be a peripheral component interconnect (PCI) bus or an extended industry standard architecture (EISA) bus, etc. The communication bus can include an address bus, a data bus, a control bus and the like. For purpose of illustration, only one thick line is used in the drawing, but it does not mean that there is only one bus or one type of bus.

The communication interface is used for communication between the electronic device and other devices.

The memory may include a random access memory (RAM) or a Non-Volatile Memory (NVM), such as at least one disk memory. Optionally, the memory may also be at least one memory device located far away from the processor.

The processor may be a general-purpose processor, including a Central Processing Unit (CPU), a Network Processor (NP), etc. Further, the processor may also be a Digital Signal Processing (DSP), an application specific integrated circuit (ASIC), a Field-Programmable Gate Array (FPGA) or other programmable logic devices, a discrete gate or transistor logic device, and a discrete hardware component.

Through the above electronic device, it can be realized that the transmitter uses the laser frequency offset-locking to modulate the frequency of the reference signal to be transmitted to the frequency difference between two lasers, and then propagates in the same optical fiber link after being combined by the optical fiber coupler. Therefore, when propagating in the optical fiber link, the noise introduced by laser polarization effect, temperature, vibration, etc. is symmetrical to the two lasers, and their influence can be reduced by beat frequency detection. Compared with the previous solution of modulating the intensity of the laser as the carrier with the microwave signal to be transmitted, for the solutions of the disclosure, an influence of a laser polarization effect and a fiber dispersion effect caused by a laser intensity modulation can be overcome, the sensitivity of noise sources such as a temperature, a vibration and a stress is reduced, and the anti-interference ability of the system is enhanced and an accuracy and stability of microwave signal frequency transmission can be improved. Also, through performing compensation on a noise of an optical fiber link in the solutions of the disclosure, the accuracy and stability of microwave signal frequency transmission in the transmission process of the optical fiber link can be further ensured.

It should be noted that relational terms such as first and second herein are only used to distinguish one entity or operation from another entity or operation, and do not necessarily require or imply any such actual relationship or order between these entities or operations. Furthermore, the terms "including", "comprising" or any other variation thereof are intended to cover non-exclusive inclusion, so that a process, a method, an article or a device including a series of elements includes not only those elements, but also other elements not explicitly listed, or elements inherent to such process, method, article or device. Without further restrictions, the elements defined by the sentence "including one . . . " do not exclude the existence of other identical elements in a process, a method, an article or a device including the elements.

The above is only a preferred embodiment of the invention, and is not intended to limit the scope of protection of the invention. Any modification, equivalent substitution, improvement, etc. which made within the spirit and the principle of the disclosure are included in the protection scope of the invention.

What is claimed is:

1. An optical fiber microwave frequency transmission method based on laser frequency offset-locking, adapted for a microwave frequency transmitter, comprising:
   generating a master laser signal and a slave laser signal by a master laser and a slave laser respectively;
   transmitting the master laser signal and the slave laser signal to a microwave frequency receiver by an optical fiber link, and locking a frequency difference between the master laser and the slave laser to a preset microwave frequency by using a laser frequency offset-locking on the master laser signal and the slave laser signal;
   receiving a return laser signal returned from the microwave frequency receiver, wherein the return laser signal comprises the master laser signal, the slave laser signal and a noise of the optical fiber link; and
   generating a reference signal, and adjusting the preset microwave frequency according to the reference signal and the return laser signal to compensate the noise of the optical fiber link to thereby make a microwave frequency subsequently received by the microwave frequency receiver approach a frequency of the reference signal;
   wherein the reference signal comprises $V_r = \cos(\omega_r t + \varphi_r)$, $\omega_r$ represents the frequency of the reference signal, $\varphi_r$ represents a phase of the reference signal, t represents a time, and $V_r$ represents the reference signal;
   wherein the adjusting the preset microwave frequency according to the reference signal and the return laser signal to compensate the noise of the optical fiber link to thereby make a microwave frequency subsequently received by the microwave frequency receiver approach a frequency of the reference signal, comprises:
   generating a first conjugated signal $V_1 = \cos(\omega_1 t + \varphi_1)$ and a second conjugated signal $V_2 = \cos(\omega_2 t + \varphi_2)$ according to the reference signal, where $\omega_1$ and $\omega_2$ represent a frequency of the first conjugated signal and a frequency of the second conjugated signal respectively, $\varphi_1$ and $\varphi_2$ represent a phase of the first conjugated signal and a phase of the second conjugated signal respectively, $\omega_1 + \omega_2 = 2\omega_r$, $\varphi_1 + \varphi_2 = 2\varphi_r + \xi$, and $\xi$ is a constant;
   performing, by a first photodetector, a conversion of laser signal to radio frequency signal on the return laser signal to thereby output a converted return laser signal $V_{back} = \cos(\omega_0 t + \varphi_0 + \xi_0 + 2\varphi_p)$; where $\varphi_p$ is the noise of the optical fiber link, $\omega_0$ represents the preset microwave frequency, $\varphi_0$ represents a phase of a voltage-controlled oscillation signal outputted by a voltage-controlled oscillator, $\xi_0 = \varphi_M - \varphi_S - \varphi 0$, $\varphi_M$ represents a phase of the master laser signal, and $\varphi_S$ represents a phase of the slave laser signal;
   performing frequency-mixing on the voltage-controlled oscillation signal and the first conjugated signal to obtain a first mixed signal $V_{e1} = \cos[(\omega_0 - \omega_1)t + \varphi_0 - \varphi_1]$ and outputting the first mixed signal;
   performing frequency-mixing on the second conjugated signal and the converted return laser signal to obtain a second mixed signal, $V_{e2} = \cos[(\omega_2 - \omega_0)t + \varphi_2 - \varphi_0 - \xi_0 - 2\varphi_p]$, and outputting the second mixed signal;
   performing frequency-mixing on the first mixed signal and the second mixed signal to obtain a third mixed signal $V_{e3} = \cos[(\omega_1 + \omega_2 - 2\omega_0)t + 100_1 + \varphi_2 - 2\varphi_0 - 2\varphi_p - \xi_0]$, and outputting the third mixed signal; and
   performing, by a first servo controller, a feedback control on the voltage-controlled oscillator according to the third mixed signal to thereby make the preset microwave frequency be equal to the frequency of the reference signal;
wherein the microwave frequency transmitter comprises: a reference signal generator, a conjugated signal generator, a first mixer, a second mixer, a third mixer, the voltage-controlled oscillator, the first servo controller, and the first photodetector;
wherein an input end of the conjugated signal generator is connected to an output end of the reference signal generator, a first output end and a second output end of the conjugated signal generator are respectively connected to a first input end of the first mixer and a first input end of the third mixer, a second input end of the first mixer is connected to an output end of the voltage-controlled oscillator, the second mixer is connected between output ends of the first mixer and the third mixer, an output end of the second mixer is connected to an input end of the first servo controller, an output end of the first servo controller is connected to a first input end of the voltage-controlled oscillator, and a second input end of the third mixer is connected to an output end of the first photodetector; and
wherein the reference signal generator is configured to generate the reference signal, the conjugated signal generator is configured to receive the reference signal and generate the first conjugated signal and the second conjugated signal according to the reference signal, the first mixer is configured to receive the voltage-controlled oscillation signal and the first conjugated signal and perform frequency-mixing on the voltage-controlled oscillation signal and the first conjugated signal to obtain the first mixed signal and output the first mixed signal to the second mixer, the third mixer is configured to receive the second conjugated signal and the converted return laser signal and perform frequency-mixing on the second conjugated signal and the converted return laser signal to obtain the second mixed signal and output the second mixed signal to the second mixer, and the second mixer is configured to receive the first mixed signal and the second mixed signal and perform frequency-mixing on the first mixed signal and the second mixed signal to obtain the third mixed signal and output the third mixed signal to the first servo controller.

2. The method according to claim 1, wherein transmitting the master laser signal and the slave laser signal to a microwave frequency receiver by an optical fiber link, and locking a frequency difference between the master laser and the slave laser to a preset microwave frequency by using a laser frequency offset-locking on the master laser signal and the slave laser signal, comprises:
combining the master laser signal and the slave laser signal to obtain a combined laser signal by an optical fiber coupler, and outputting the combined laser signal split into equal proportions to a first output end and a second output end of the optical fiber coupler;
transmitting the combined laser signal outputted from the first output end of the optical fiber coupler to the microwave frequency receiver by the optical fiber link; and
performing the laser frequency offset-locking on the combined laser signal outputted from the second output end of the optical fiber coupler to lock a frequency difference between the master laser signal and the slave laser signals respectively generated from the master laser and the slave laser to the preset microwave frequency.

3. The method according to claim 2, wherein the master laser signal comprises $E_M(t)=\cos(\omega_M t+\varphi_M)$, where om represents a frequency of the master laser signal, and $E_M(t)$ represents the master laser signal; and the slave laser signal comprises $E_S(t)=\cos(\omega_S t+\varphi_S)$, where $\omega S$ represents a frequency of the slave laser signal, and $E_S(t)$ represents the slave laser signal; and
wherein performing the laser frequency offset-locking on the combined laser signal outputted from the second output end of the optical fiber coupler to lock a frequency difference between the master laser signal and the slave laser signals respectively generated from the master laser and the slave laser to the preset microwave frequency, comprises:
processing, by a second photodetector, the combined laser signal outputted from the second output end of the optical fiber coupler to output a first beat frequency signal $I(t)=\cos[(\omega_M-\omega_S)t+(\varphi_M-\varphi_S)]$ of the master laser signal and the slave laser signal;
generating, by the voltage-controlled oscillator, the voltage-controlled oscillation signal $V_0=\cos(\omega_0 t+\varphi_0)$ with the preset microwave frequency;
performing frequency-mixing on the first beat frequency signal and the voltage-controlled oscillation signal to obtain an error signal $V_{e0}=\cos[(\omega_M-\omega_S-\omega_0)t+(\varphi_M-\varphi_S-\varphi_0)]$ of the frequency difference between the master laser signal and the slave laser signal compared with the preset microwave frequency; and
receiving, by a second servo controller, the error signal, and adjusting the frequency of the master laser signal or the frequency of the slave laser signal to lock the frequency difference between the master laser signal generated from the master laser and the slave laser signal generated from the slave laser to the preset microwave frequency.

4. The method according to claim 3, wherein adjusting the frequency of the master laser signal or the frequency of the slave laser signal to lock the frequency difference between the master laser signal generated from the master laser and the slave laser signal generated from the slave laser to the preset microwave frequency, comprises:
adjusting the frequency $\omega_M$ of the master laser signal or the frequency $\omega_S$ of the slave laser signal to make $\omega_M-\omega_S-\omega_0=0$ be satisfied, so that the error signal after the adjusting is a constant cos $[\xi_0]$.

5. The method according to claim 1, wherein performing, by a first servo controller, a feedback control on the voltage-controlled oscillator according to the third mixed signal to thereby make the preset microwave frequency be equal to the frequency of the reference signal, comprises:
adjusting, by the first servo controller, an input voltage of the voltage-controlled oscillator to thereby make a frequency of the voltage-controlled oscillation signal outputted by the voltage-controlled oscillator satisfy that $\omega_1+\omega_2-2\omega_0=0$, so that the third mixed signal after the adjusting is a constant cos $[\xi_1]$, where $\xi_1 32 \varphi_1+\varphi_2-2\varphi_0-2\varphi_p-\xi_0$.

6. The method according to claim 1, wherein the frequency of the reference signal is a microwave band frequency below 10 GHz.

7. The method according to claim 1, wherein the microwave frequency transmitter further comprises: a fourth mixer, an optical fiber coupler, a second photodetector, and a second servo controller;
wherein an output end of the master laser and an output end of the slave laser are respectively connected to two input ends of the optical fiber coupler, first and second output ends of the optical fiber coupler are respectively connected to the optical fiber link and an input end of the second photodetector, a first input end of the fourth mixer is connected to an output end of the second photodetector, a second input end of the fourth mixer is connected to a second output end of the voltage-controlled oscillator, an input end of the second servo controller is connected to an output end of the fourth mixer, and an output end of the second servo controller is connected to the master laser or the slave laser;

wherein the master laser signal comprises $E_M(t)=\cos(\omega_M t+\varphi_M)$, where $\omega_M$ represents a frequency of the master laser signal, and $E_M(t)$ represents the master laser signal; and the slave laser signal comprises $E_S(t)=\cos(\omega_S t+\varphi_S)$, where $\omega_S$ represents a frequency of the slave laser signal, and $E_S(t)$ represents the slave laser signal;

wherein transmitting the master laser signal and the slave laser signal to a microwave frequency receiver by an optical fiber link, and locking a frequency difference between the master laser and the slave laser to a preset microwave frequency by using a laser frequency offset-locking on the master laser signal and the slave laser signal, comprises:

combining the master laser signal and the slave laser signal to obtain a combined laser signal by the optical fiber coupler, and outputting the combined laser signal split into equal proportions to the first output end and the second output end of the optical fiber coupler;

transmitting the combined laser signal outputted from the first output end of the optical fiber coupler to the microwave frequency receiver by the optical fiber link;

processing, by the second photodetector, the combined laser signal outputted from the second output end of the optical fiber coupler to output a first beat frequency signal $I(t)=\cos[(\omega_M-\omega_S)t+(\varphi_M-\varphi_S)]$ of the master laser signal and the slave laser signal to the fourth mixer;

generating, by the voltage-controlled oscillator, the voltage-controlled oscillation signal $V_0=\cos(\omega_0 t+\varphi_0)$ with the preset microwave frequency, and outputting the voltage-controlled oscillation signal to the fourth mixer;

receiving, by the fourth mixer, the first beat frequency signal and the voltage-controlled oscillation signal, and performing frequency-mixing on the first beat frequency signal and the voltage-controlled oscillation signal to obtain an error signal $V_{e0}=\cos[(\omega_M-\omega_S-\omega_0)t+(\varphi_M-\varphi_S-\varphi_0)]$ of the frequency difference between the master laser signal and the slave laser signal compared with the preset microwave frequency; and receiving, by the second servo controller, the error signal from the fourth mixer, and adjusting the frequency of the master laser signal or the frequency of the slave laser signal to lock the frequency difference between the master laser signal generated from the master laser and the slave laser signal generated from the slave laser to the preset microwave frequency.

\* \* \* \* \*